(12) United States Patent
Elliott et al.

(10) Patent No.: US 7,954,790 B2
(45) Date of Patent: Jun. 7, 2011

(54) COMPOSITE SHAFT ASPIRATOR ASSEMBLY

(75) Inventors: B. James Elliott, Twinsburg, OH (US); Trent Lydic, Lyndhurst, OH (US); Terry Fischer, Mantua, OH (US)

(73) Assignee: Jet, Inc., Cleveland, OH (US)

( * ) Notice: Subject to any disclaimer, the term of this patent is extended or adjusted under 35 U.S.C. 154(b) by 233 days.

(21) Appl. No.: 12/473,345

(22) Filed: May 28, 2009

(65) Prior Publication Data

US 2009/0243124 A1 Oct. 1, 2009

Related U.S. Application Data

(63) Continuation-in-part of application No. 11/949,968, filed on Dec. 4, 2007.

(60) Provisional application No. 60/878,372, filed on Jan. 3, 2007.

(51) Int. Cl.
*C02F 1/74* (2006.01)
*C02F 7/00* (2006.01)

(52) U.S. Cl. .......................................... 261/85; 261/87

(58) Field of Classification Search .............. 261/83–85, 261/87, 93; 366/101, 102; 239/8; 210/628, 210/150
See application file for complete search history.

(56) References Cited

U.S. PATENT DOCUMENTS

| | | | | |
|---|---|---|---|---|
| 2,996,287 A | * | 8/1961 | Audran | 366/265 |
| 3,867,488 A | * | 2/1975 | Porterfield | 261/87 |
| 4,608,157 A | * | 8/1986 | Graves | 210/86 |
| 4,645,473 A | | 2/1987 | Mochizuki | |
| 5,336,399 A | * | 8/1994 | Kajisono | 210/170.02 |
| 6,070,734 A | * | 6/2000 | Hunt et al. | 209/169 |
| 6,318,705 B1 | | 11/2001 | MacLaren | |
| 7,784,769 B2 | * | 8/2010 | Hoefken | 261/85 |

OTHER PUBLICATIONS

International Preliminary Report on Patentability for International Application PCT/US07/86496. Jul. 7, 2009, International Bureau of WIPO.

* cited by examiner

*Primary Examiner* — Frank M Lawrence
(74) *Attorney, Agent, or Firm* — The Marbury Law Group PLLC

(57) ABSTRACT

A composite hollow aspirator shaft is formed of fiberglass-reinforced phenolic resin that resists abrasion and reduces the amount of vibration that is transferred to the motor rotating the shaft, and the motor's bearings to extend motor and bearing life. An aspirator tip is adhesively attached to the composite aspirator shaft and includes an access hole for cleaning inside the hollow aspirator shaft. The hole is in axial alignment with the hollow aspirator shaft and a selectively-removable plug is used to seal the hole during aspirator use. When the aspirator tip is rotated in a liquid, fluidic forces are transferred to the shaft where they are attenuated. A splined hub is used to attach a foam restrictor near the other end of the shaft. The composite shaft material has a flexural modulus, or ratio, within the elastic limit of any applied stress.

20 Claims, 6 Drawing Sheets

COMPOSITE SHAFT ASPIRATOR ASSEMBLY

RELATED APPLICATIONS

This application is a continuation-in-part of co-pending U.S. application Ser. No. 11/949,968 filed Dec. 4, 2007, which claims the benefit of U.S. Provisional Application Ser. No. 60/878,372 filed Jan. 3, 2007, which is hereby incorporated by reference in its entirety for all purposes.

BACKGROUND

Various embodiments relate generally to improvements for mechanical aerators in the form of a composite shaft, aspirator, and foam restrictor coupling that reduces transmission of vibrational energy, simplifies assembly, and allows access for cleaning. More particularly, embodiments are drawn to a composite aspirator shaft with an adhesively-attached aspirator tip for mixing and adding air to wastewater and/or splined coupling for a foam restrictor.

Prior art wastewater aspirator shafts typically use a stainless steel aspirator shaft, as illustrated at reference numeral 9 in FIG. 3 of commonly-assigned U.S. Pat. No. 5,484,524. Plastic aspirator tips attach to such shafts using a threaded attachment, such as disclosed in commonly-assigned U.S. Pat. No. 6,318,705 and foam restrictors are typically attached to such shafts with set screws.

BRIEF SUMMARY

A hollow, composite shaft for a mechanical aerator is formed of fiberglass-reinforced phenolic resin that reduces the amount of vibration that is transferred to the motor/bearings to extend motor/bearing life. A plastic aspirator tip is adhesively attached to the composite shaft to ease assembly and the aspirator tip preferably has a bore hole and removable plug that are coaxial with the composite shaft to allow cleaning. A splined hub can be adhesively attached to the composite shaft for carrying a foam restrictor that is secured to the hub with involute splines and a retainer such as an e-clip. When the aspirator tip is rotated in a liquid, fluidic forces are transferred to the shaft. Embodiments disclosed herein attenuate the forces. The composite shaft material has a flexural modulus, or ratio, within the elastic limit of any applied stress, and allows the transfer of the flexural or oscillatory energy into heat within the shaft instead of conveying the energy in the form of vibration/oscillations along the axial length of the shaft.

In an embodiment, a hollow shaft of the assembly incorporates 13-30% fiberglass by total volume and transfers only a fraction of the vibrational energy to the motor/bearings. Also, the fiberglass resists abrasion better in wastewater than stainless steel.

The composite shaft can be attached to a drive shaft of a motor using a coupling formed of a suitably corrosion-resistant material, such as 6-6 Nylon, fiberglass reinforced phenolic resin, or stainless steel. The coupling can be attached to the shaft with any suitable means, but preferably employs an adhesive such as, but not limited to, flexible epoxy. The aspirator tip and foam restrictor assembly are formed of a suitably corrosion-resistant and lightweight material, such as 6-6 Nylon.

DETAILED DESCRIPTION OF THE INVENTION

Figure 1:
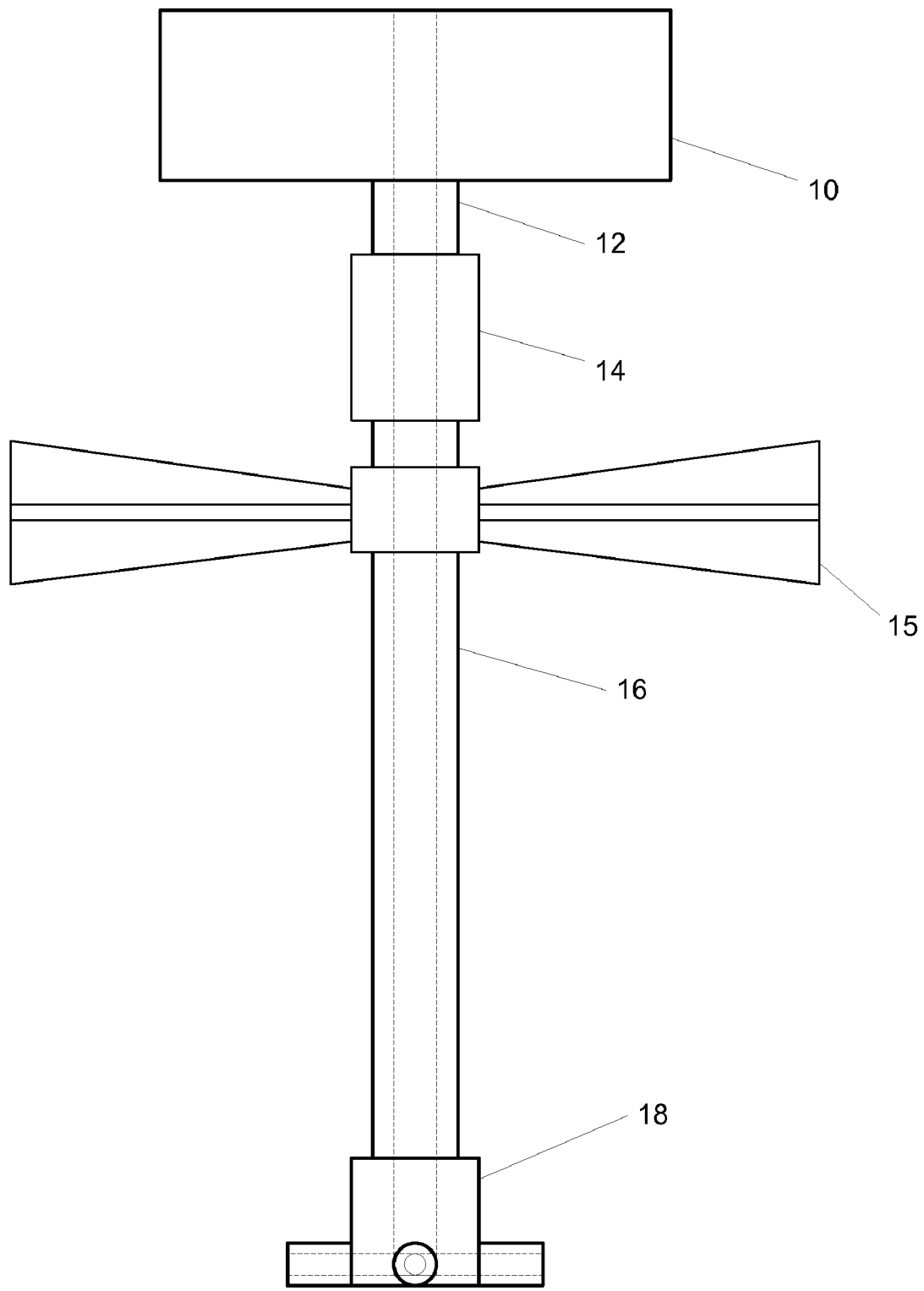
FIG. 1 illustrates an elevation view of one embodiment of an aerator assembly that can employ various embodiments.

FIG. 1 is a diagram of a general aerator assembly in which the present invention can be used (not to scale). The aerator includes a motor 10 which rotates a motor shaft 12. A coupling 14 attaches the motor shaft 12 to aspirator shaft 16 at one end of the aspirator shaft 16. A foam restrictor assembly 15 is attached below the coupling 14 and beats down any foam that forms at the surface of the liquid and circulates gas/vapor to help cool motor 10. An aspirator tip 18 is attached at the other end of the aspirator shaft 16. In use, the aspirator tip 18 and a substantial portion of the aspirator shaft 16 will be submerged in liquid, such as wastewater. As illustrated, each of the motor shaft 12, coupling 14, aspirator shaft 16 and aspirator tip 18 are hollow so as to allow air or other gas to be drawn into the liquid being aerated.

As discussed above, the composite aspirator shaft 16 for the mechanical aerator is formed of fiberglass-reinforced phenolic resin that reduces the amount of vibration that is transferred to the motor 10 or its bearings to extend motor/bearing life. When the aspirator tip 18 is rotated in a liquid, fluidic forces are transferred to the aspirator shaft 16. The aspirator shaft 16 attenuates the forces because the composite aspirator shaft material has a flexural modulus, or ratio, within the elastic limit of any applied stress, and is sufficiently low to allow the transfer of the flexural or oscillatory energy into heat within the shaft and/or coupling instead of conveying the energy in the form of vibration/oscillations along the axial length of the shaft and coupling to the motor.

In one embodiment, a 27.5" shaft with a 0.63" outer diameter and 0.5" inner diameter incorporates 13-30% fiberglass by total volume, weighs ~109 grams, and rotates a tip weighing ~322 grams. This embodiment transfers ¼ of the vibrational energy to the motor/bearings. In one embodiment, the weave of the fiberglass is comprised of primary strands oriented on ~0.5 mm centers and oriented into a square weave pattern. Testing has found that this material resists abrasion better in wastewater than stainless steel.

Figure 2A:
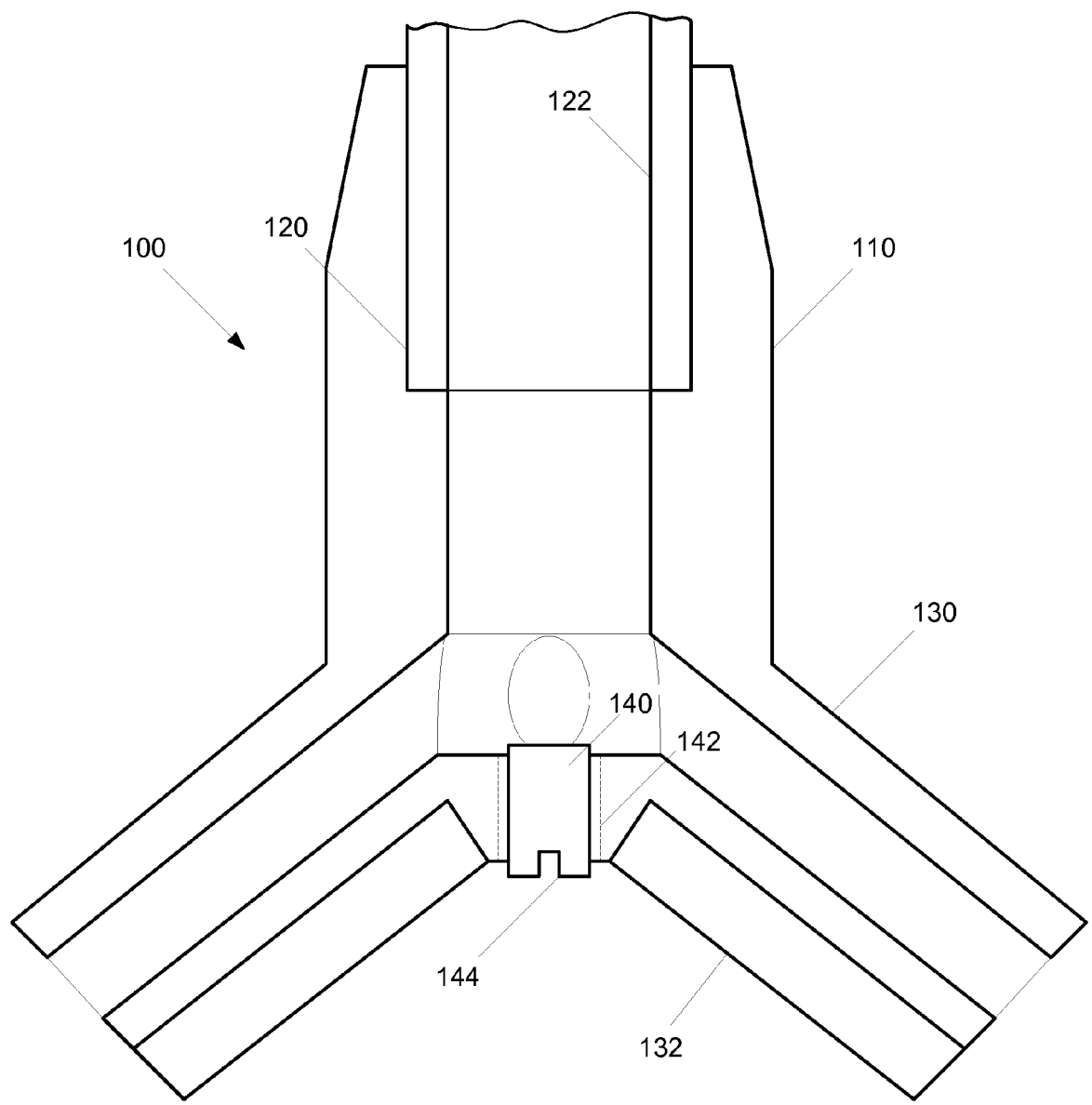
FIG. 2A illustrates a cross sectional view of an aspirator tip body in accordance with an embodiment.
Figure 2B:
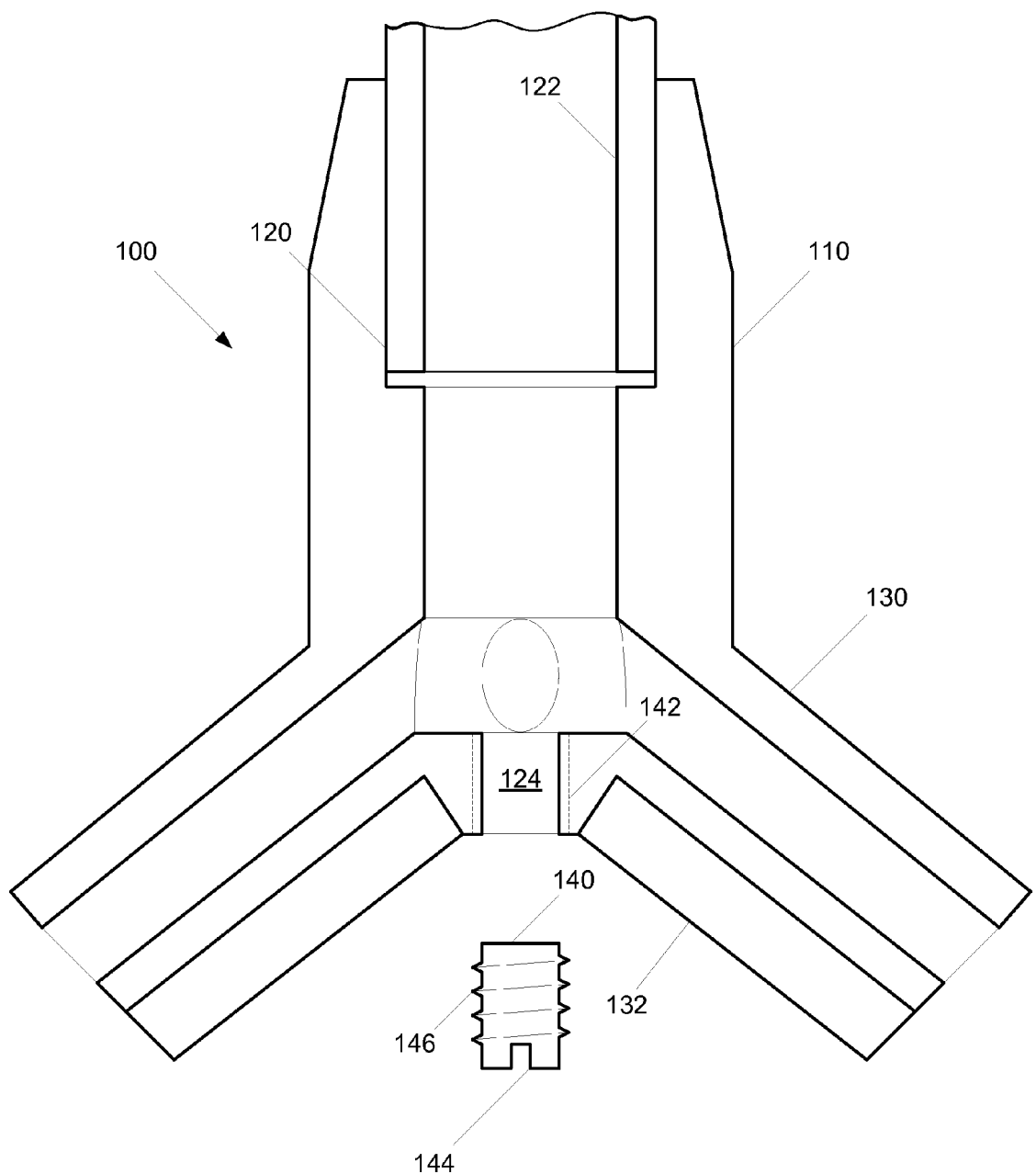
FIG. 2B illustrates a cross sectional view of a partially disassembled aspirator tip body in accordance with an embodiment.

As illustrated in the diagrams (not to scale) of FIGS. 2A-B, an aspirator tip 100 includes a generally cylindrical main body 110 having a central axis and an open first end for engagement with composite aspirator shaft 122. An inner wall of the main body 110 defines a hollow interior and preferably includes a stepped portion of inner wall 120 that is dimensioned to receive the composite aspirator shaft 122 along with a small amount of adhesive to adhesively attach the composite shaft 122 to the aspirator tip 100. A plurality of straight, equally-spaced aspirator tubes 130 extend radially from a second end of the main body 110, preferably at an angle of approximately 45 degrees from the central axis in a direction opposite from the composite aspirator shaft 122. In a typical embodiment, four aspirator tubes 130 are employed. The aspirator tubes 130 include open-ended conduits in communication at one end with the hollow interior of the main body 110. Each aspirator tube 130 further preferably includes a planar fin portion 132 extending from a side opposite the first end of the main body 110. The fins 132 extend in a direction parallel to the central axis.

When the composite aerator shaft 122 rotates the aspirator 100 in a liquid, the low pressure formed behind the fins 132 causes cavitation wherein voids, pockets of vapor formed due to the low pressure, are formed. These cavitation voids collapse rapidly, causing agitation which breaks up any agglomerated material in the liquid and mechanically reduces particle size, as disclosed in U.S. Pat. No. 6,318,705, which is hereby incorporated by reference. As stated in U.S. Pat. No. 5,599,452, which is incorporated herein by reference, this reduction in particle size is useful for enhancing wastewater treatment.

The locally formed low pressure region adjacent the rotating aspirator 100 additionally draws fluid from the hollow interior through the aspirator tubes 130 and into the liquid. When used for wastewater treatment, the fluid can be air or oxygen. This is also useful for enhancing wastewater treatment, as disclosed in U.S. Pat. No. 5,599,452.

However, unlike the aspirator tips disclosed in U.S. Pat. Nos. 5,599,452 and 6,318,705 that are threaded onto the aspirator shaft, aspirator 100 is adhesively attached to the composite aspirator shaft 122 to ease assembly. If a flexible adhesive such as flexible epoxy is used, the flexible epoxy allows the shaft-to-aspirator union to remain intact while the aspirator shaft 122 flexes. Since an adhesively-attached aspirator 100 cannot be easily removed in order to clean out the interior of the composite aspirator shaft 122, aspirator tip 100 preferably includes an access hole 124 along the central axis opposite the open first end of the main body 110 that can be used to clean out the interior of the composite aspirator shaft 122. The access hole 124 has internal threads 142 formed on the walls to engage the external threads 146 of plug 140. Preferably, the directions of the threads 142, 146 are selected so that rotation of the composite aspirator shaft 122 by the motor will act to tighten the plug 140. Plug 140 is selectively-removable and ordinarily positioned to plug hole 124 when the aspirator is in use, as shown in FIG. 2A, but can be removed for cleaning, as illustrated in FIG. 2B. Plug 140 is illustrated with a slot 144 to allow installation and removal using a bladed screwdriver. However, other tool-engaging surfaces 144 can be used, including, but not limited to, Phillips, hex, and Torx recesses, and hex and square heads.

In a preferred embodiment, the aspirator 100 and plug 140 are formed of Nylon 6-6 with 13% fiberglass fill, red. The balance of the aspirator 100 should preferably be held to a maximum of 0.01 inch-ounce. The tips of the aspirator tubes 130 should be equally and accurately spaced so as to track in the same plane within 0.010 T.I.R. to the central axis of the main body 110 and composite aspirator shaft 122.

Figure 3:
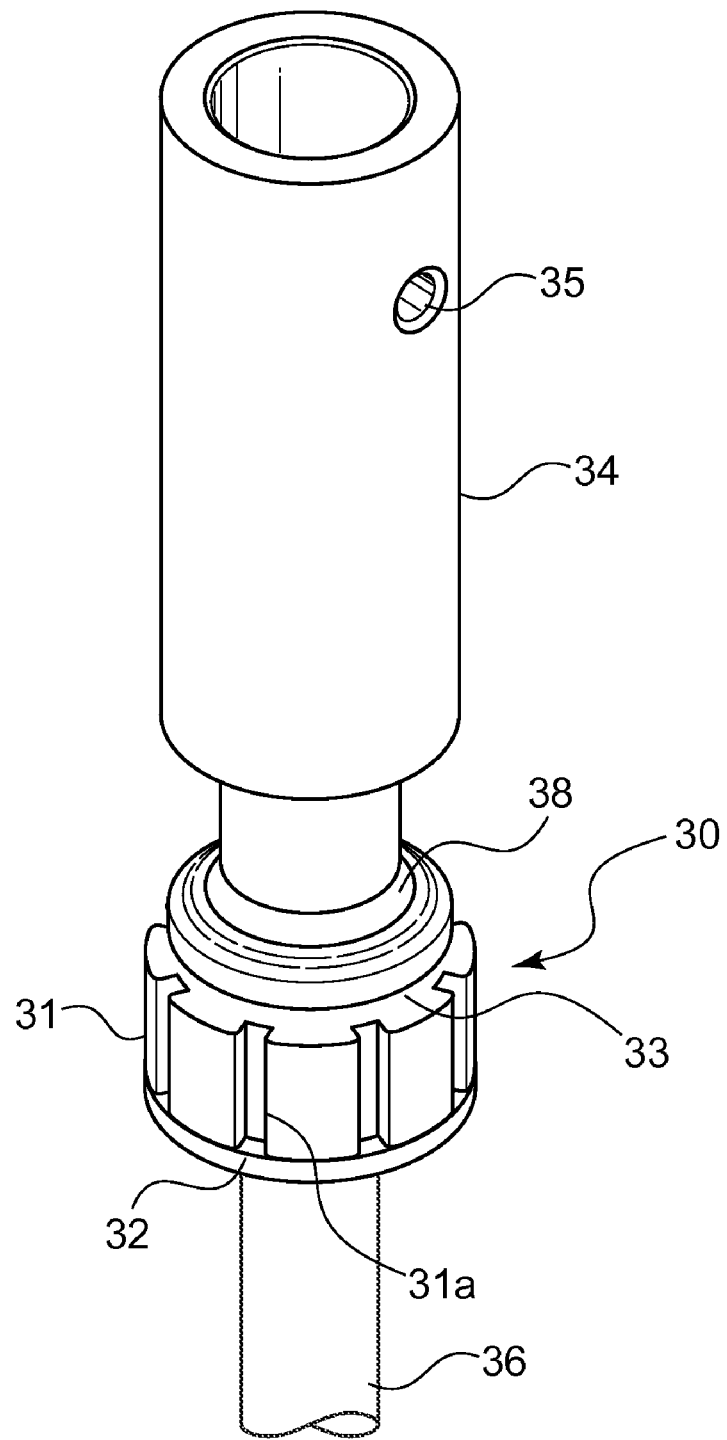
FIG. 3 illustrates an embodiment of a splined hub attached to a composite aspirator shaft.

FIG. 3 illustrates details of an embodiment of a splined hub 30 that can be used for mounting a foam restrictor. Hub 30 includes a plurality of splines 31 that form recesses 31A that have a closure 32 at one end and an opening adjacent a circumferential groove 33 at the other end. The radius of hub 30 at recesses 31A is preferably slightly larger than shaft coupling element 34 to allow a foam restrictor plate (see FIG. 4A) to slide over the coupling element 34 for installation on the hub 30.

Splined hub 30 is preferably adhesively attached to the composite aspirator shaft 36 with flexible epoxy 38 to allow the shaft-to-hub union to remain intact while the aspirator shaft 36 flexes. By using an adhesive instead of a set screw, one can avoid damaging the surface of the composite shaft 36. In a preferred embodiment, the hub 30 is formed of Nylon 6-6 with 13% fiberglass fill, red. The balance of the hub 30 should preferably be held to a maximum of 0.05 inch-ounce.

Similarly, coupling 34 is preferably adhesively attached to the composite aspirator shaft 36 with flexible epoxy (not shown) to allow the shaft-to-coupling union to remain intact while the aspirator shaft 36 flexes. Again, by using an adhesive instead of a set screw, one can avoid damaging the surface of the composite shaft 36. Coupling 34 can include a set screw assembly 35 for attachment of the coupling 34 to the hollow metal motor shaft of the aspirator motor that is not as subject to damage from a set screw. Preferably, coupling 34 is made of stainless steel and the balance should preferably be held to a maximum of 0.08 inch-ounce.

Figure 4A:
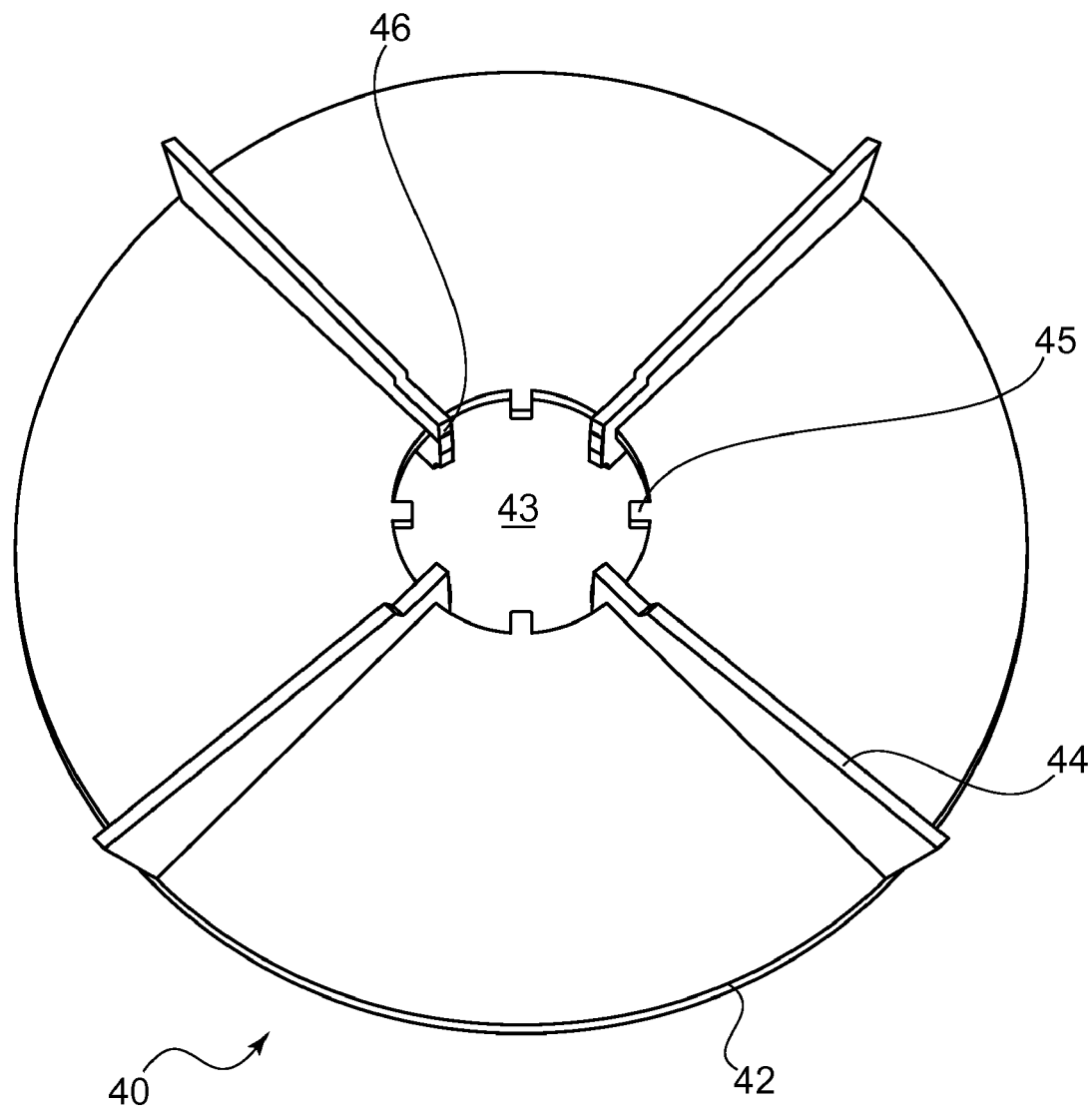
FIG. 4A illustrates an embodiment of a foam restrictor plate.

FIG. 4A illustrates an embodiment of a foam restrictor plate 40 that includes a disc 42, central opening 43, and radially-extending fins 44. The radially-extending fins 44 beat down any foam that forms and has the additional benefit, via the top fins, of helping keep the aspirator motor cool. In use, one can typically observe a 20° F. difference between the top end bell and the bottom end bell of the motor due to the cooling effect caused by rotation of these fins 44.

Figure 5A:
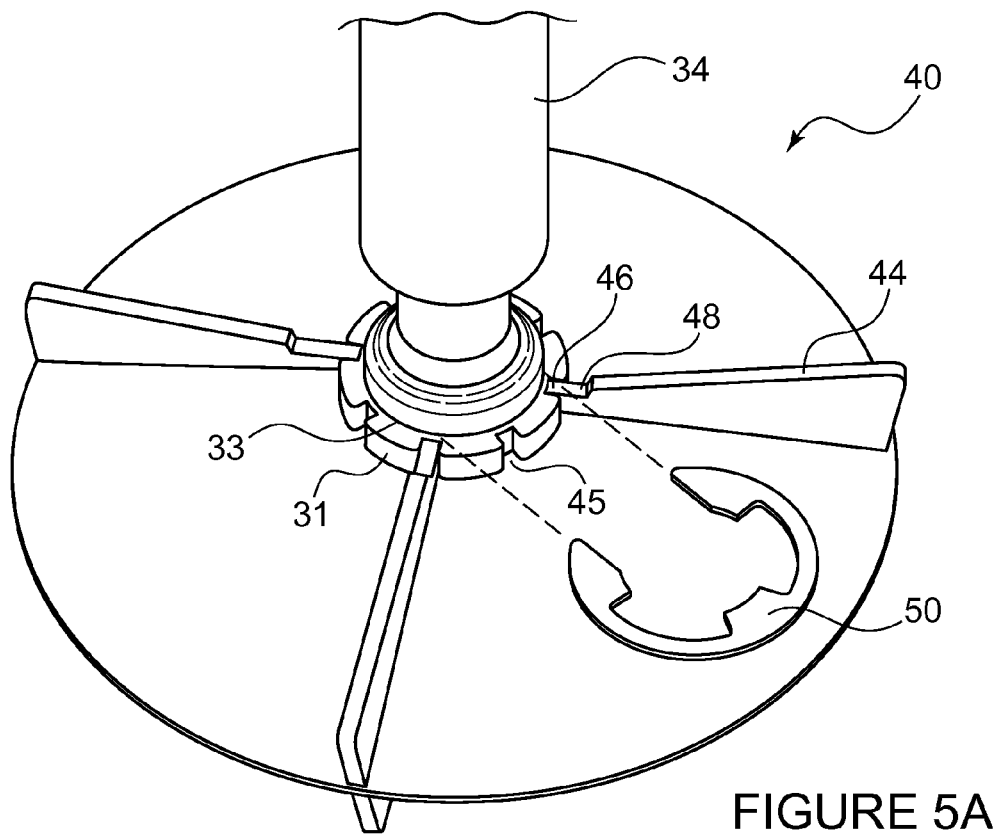
FIG. 5A illustrates an embodiment of a foam restrictor assembly attached to a composite aspirator shaft.

The central opening 43 in disc 42 preferably allows foam restrictor plate 40 to slide over a coupling element for installation on the hub (see FIGS. 3 and 5A). The edge of the central opening 43 includes a plurality of splines formed by tabs 45 and extensions 46 that are dimensioned to fit the recesses of the splined hub. In a preferred embodiment, the foam restrictor plate 40 is formed of Nylon 6-6 with 13% fiberglass fill, red. The balance of the foam restrictor plate 40 should preferably be held to a maximum of 0.05 inch-ounce.

Figure 4B:
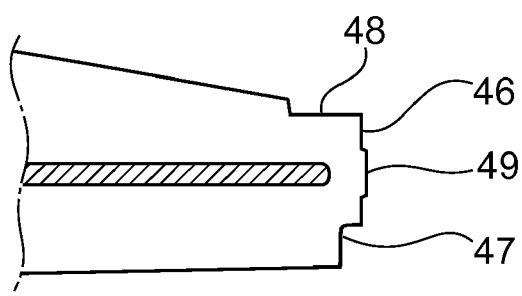
FIG. 4B illustrates a partial cross section of a foam restrictor plate.

FIG. 4B illustrates a partial cross section of an embodiment of a foam restrictor plate 40. As illustrated in this embodiment, fins 44 terminate with extensions 46 that engage the recesses in the splined hub. One end of extension 46 preferably has a notch 47 for engaging a closure of the corresponding recess. The other end of extention 46 preferably has a flattened portion 48 for engaging a surface of a retainer use to secure the extensions 46 in the recesses in the splined hub. An edge portion of extension 46 can include material 49 that can be machined so as to center and balance the foam restrictor plate to reduce vibration caused by the foam restrictor assembly.

FIG. 5A illustrates an embodiment of a foam restrictor assembly attached to a composite aspirator shaft. The foam restrictor plate 40 has been slid over coupling 34 and tabs 45 and extensions 46 engage the recesses formed between splines 31. Surface 48 of extensions 46 are lined up with circumferential groove 33 such that a retainer 50, such as the illustrated e-clip, can be inserted into the groove 33 to secure the foam restrictor plate 40 to the splined hub 30. When the shaft is rotated, the fins 44 blow air radially outward to break up any foam bubbles that form on the surface of the liquid being aerated to prevent foam from reaching the aspirator motor. While retainer 50 is illustrated as an e-clip, the retainer can take other forms without departing from the scope of the invention, including but not limited to c-clips, circlips, and snap rings. Preferably, the retainer 50 is or can be rotationally balanced to reduce vibration.

Figure 5B:
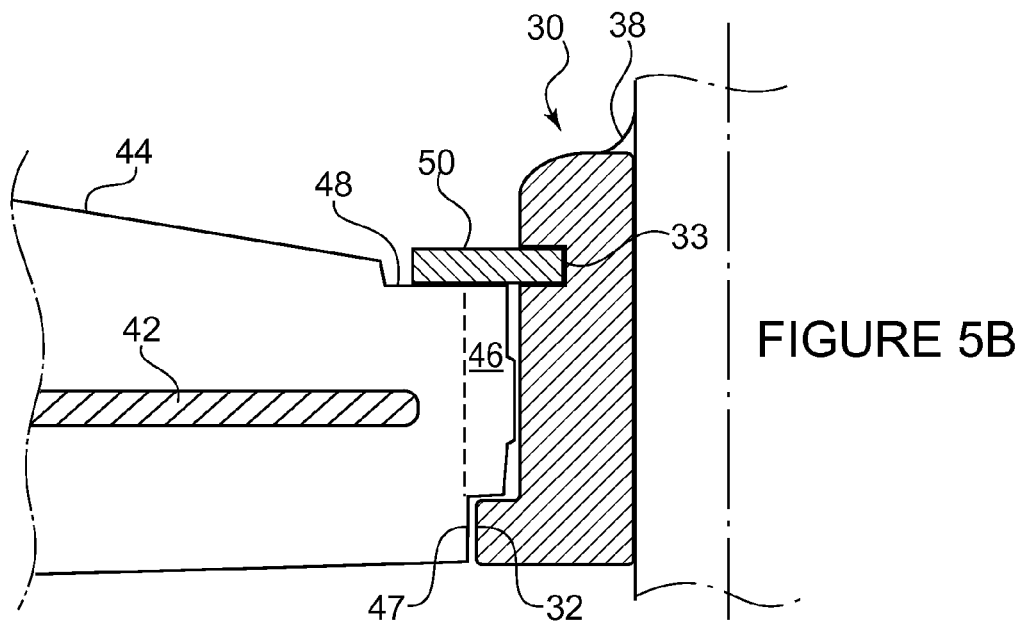
FIG. 5B illustrates partial cross sectional view of an embodiment of a foam restrictor assembly.

FIG. 5B illustrates partial cross sectional view of an embodiment of a foam restrictor assembly, with elements retaining their previously-described reference numbers. As can be seen, extension 46 is retained in place on hub 30 between recess closure 32 and retainer 50 when retainer 50 is positioned in circumferential groove 33 such that a surface of the retainer is adjacent to flat surface 48 of the extension 46.

The unique mechanical properties of the composite shaft relate directly to mitigating the effects of dynamic vibration energy conveyed to the motor assembly, and the associated wear effects such vibration imparts upon the operational life of the motor, along with the wear mitigating effects realized by an explicit selection of constituent materials comprising the composite shaft. Use of the composite shaft is further facilitated by use of adhesively-attached components such as aspirator tips, foam restrictor assemblies and couplings. An entire composite shaft aspirator assembly, with a clean-out plug in the aspirator tip and a foam restrictor plate, can be installed onto the shaft of an aspirator motor. The clean-out plug can be selectively removed and a replacement foam restrictor plate can be installed over an existing coupling and onto the splined hub so as to allow maintenance tasks to be performed without complete disassembly.

The composite shaft is preferably comprised of a material with a flexural modulus, or the ratio, within the elastic limit of any applied stress and sufficiently low to allow the transference of the flexural or oscillatory energy to be translated into heat within the structure of the material instead of conveying the energy in the form of vibration/oscillations along the axial length of the shaft, and thus to the bearings locating the shaft in place in coordination with the aerator motor assembly.

This application is a classic example of a fluidic-mass-spring dampener, in which the amplitude of the oscillations of system comprised of the motor assembly and the composite shaft assembly, when coupled to the fluidic operating environment and its dampening factor, dependant upon the viscosity of the fluid, comprise such a system wherein the system reduces the amplitude of the oscillations of the components within, and up to, the point of becoming a critically damped system.

Empirical observations made of the comparisons of each such described systems have yielded data that suggests that the damping factor of the composite shaft, when compared to the prior art stainless shaft, yields a ratio of about 25% in favor of the composite shaft when measured as a direct data point relating to the mass/velocity relationship of the complete assembly in operation.

A secondary improvement over prior art aeration shafts and the like relates to the ability of the shaft constituent material to resist abrasion presented by materials found in the fluid which may be introduced into the system within its operating life. Examples of such materials in the wastewater environment include: hair, cellulose fiber, polymer fibers, and other material other than the human waste for which the system was originally developed to process. There has been a great deal of observation of extreme abrasive wear perpendicular to the axial center of the shaft material due to the entanglement of these or other foreign materials around the shaft diameter. Over time, wear on a magnitude sufficient to actually cut through the wall thickness of the stainless steel shaft has been observed. Use of embodiments of the composite shaft in this application dramatically mitigate the effects of wear/cutting of the shaft perpendicular to its axis by foreign matter being entrapped around it, by the rotation of the shaft in the operating fluid, through the use of an incorporation of a glass fiber material or similar fiber material within the matrix of materials which comprise the composite shaft. The incorporation of a material in this composite shaft which is of a more abrasion resistant nature than the stainless steel, aids in the prevention of wear on the shaft. Selection of the material incorporated into the matrix comprising the composite shaft can be tailored to be comprised of a material with the physical characteristics necessary to actually abrade and liberate any foreign material which may become entangled onto the shaft, without the shaft suffering any significant adverse effects to its desired geometry or function.

In one embodiment to an aerator for mixing and adding air to wastewater and for receiving rotational forces from a motor, the aerator comprises: a hollow aspirator shaft for connection at one end to the motor; and an aspirator tip adhesively connected to another end of the aspirator shaft opposite the end connected to the motor; wherein the hollow tube substantially attenuates transmission of vibrational energy from the aspirator tip to the motor and the aspirator tip includes an access hole in axial alignment with the hollow aspirator shaft and a selectively-removable plug for the access hole.

In a variation of this embodiment, the hollow aspirator shaft is optionally formed from fiberglass-reinforced phenolic resin and incorporates about 13-30% fiberglass by total volume. In another variation, the hollow aspirator shaft transfers only about ¼ of the vibrational energy from the aspirator tip to the motor and its bearings. In yet another variation, the access hole comprises internal threads and the selectively-removable plug comprises corresponding external threads, wherein the internal and external threads are oriented in a direction that tightens during motor operation. Optionally, the selectively-removable plug further comprises a tool engagement surface on an exterior thereof.

In a further variation of this embodiment, the assembly includes a foam restrictor assembly attached to the hollow aspirator shaft, comprising: an externally splined hub adhesively attached to the hollow aspirator shaft with flexible epoxy, wherein splines on the hub form recesses with a closure adjacent a first end and a circumferential slot adjacent a second end; a foam restrictor plate comprising a central opening with internal splines dimensioned for engaging the externally splined hub, with a first end of a plurality of the internal splines formed as extensions abutting against the closure adjacent the first end of the recesses at a first end and a second end of the extensions adjacent the circumferential slot adjacent the second end of the recesses; and a retainer dimensioned to engage the circumferential slot and retain the foam restrictor plate on the externally splined hub. The retainer can optionally be an e-clip.

In a second embodiment to an aerator for mixing and adding air to wastewater and for receiving rotational forces from a motor, the aerator comprises: a hollow aspirator shaft for connection at one end to a motor, the hollow aspirator shaft comprising from about 13 percent to about 30 percent fiberglass by total volume; and an aspirator tip adhesively connected to another end of the hollow tube opposite the end connected to the motor, wherein the aspirator tip includes an access hole in axial alignment with the hollow aspirator shaft and a selectively-removable plug for the access hole.

In a variation of this second embodiment, the hollow aspirator shaft transfers only about ¼ of the vibrational energy from the aspirator tip to the motor and its bearings. In yet another variation, the access hole comprises internal threads and the selectively-removable plug comprises corresponding external threads, wherein the internal and external threads are oriented in a direction that tightens during motor operation. Optionally, the selectively-removable plug further comprises a tool engagement surface on an exterior thereof.

In a further variation of this second embodiment, the aerator includes a foam restrictor assembly attached to the hollow aspirator shaft, comprising: an externally splined hub adhesively attached to the hollow aspirator shaft with flexible epoxy, wherein splines on the hub form recesses with a closure adjacent a first end and a circumferential slot adjacent a second end; a foam restrictor plate comprising a central opening with internal splines dimensioned for engaging the externally splined hub, with a first end of a plurality of the internal splines formed as extensions abutting against the closure adjacent the first end of the recesses at a first end and a second end of the extensions adjacent the circumferential slot adjacent the second end of the recesses; and a retainer dimensioned to engage the circumferential slot and retain the foam restrictor plate on the externally splined hub. The retainer can optionally be an e-clip.

In a third embodiment to an aerator for mixing and adding air to wastewater and for receiving rotational forces from a motor, the aerator comprises: a hollow aspirator shaft for connection at one end to the motor; an aspirator tip adhesively connected to another end of the aspirator shaft opposite the end connected to the motor; and a foam restrictor assembly attached to the hollow aspirator shaft using a splined hub; wherein the hollow tube substantially attenuates transmission of vibrational energy from the aspirator tip to the motor.

In a variation of this third embodiment, the hollow aspirator shaft is optionally formed from fiberglass-reinforced phenolic resin and incorporates about 13-30% fiberglass by total volume. In another variation, the hollow aspirator shaft transfers only about ¼ of the vibrational energy from the aspirator tip to the motor and its bearings. In yet another variation, the aspirator tip includes an access hole in axial alignment with the hollow aspirator shaft and a selectively-removable plug for the access hole, and the access hole optionally comprises internal threads and the selectively-removable plug comprises corresponding external threads, wherein the internal and external threads are oriented in a direction that tightens during motor operation. Optionally, the selectively-removable plug further comprises a tool engagement surface on an exterior thereof.

In a further variation of this third embodiment, the foam restrictor assembly further comprises: an externally splined hub adhesively attached to the hollow aspirator shaft with flexible epoxy, wherein splines on the hub form recesses with a closure adjacent a first end and a circumferential slot adjacent a second end; a foam restrictor plate comprising a central opening with internal splines dimensioned for engaging the externally splined hub, with a first end of a plurality of the internal splines formed as extensions abutting against the closure adjacent the first end of the recesses at a first end and a second end of the extensions adjacent the circumferential slot adjacent the second end of the recesses; and a retainer dimensioned to engage the circumferential slot and retain the foam restrictor plate on the externally splined hub. The retainer can optionally be an e-clip.

Preferred and alternate embodiments have now been described in detail. It is to be noted, however, that these embodiments are merely illustrative of the principles underlying the inventive concept. It is therefore contemplated that various modifications of the disclosed embodiments will be apparent to persons of ordinary skill in the art, without departing from the scope of the present invention. For example, fluids other than air, as well as liquids other than wastewater, may be employed with the apparatus and method of the present invention. Similarly, any material suitable for a particular application can be used, including but not limited to various plastics, metals, ceramics, and combinations thereof.

A system and method for providing a composite shaft aspirator assembly has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. An aerator for mixing and adding air to wastewater and for receiving rotational forces from a motor, the aerator comprising:
    a hollow aspirator shaft for connection at one end to the motor; and
    an aspirator tip adhesively connected to another end of the hollow aspirator shaft opposite the end connected to the motor;
    wherein the aspirator shaft is comprised of material that substantially attenuates transmission of vibrational energy from the aspirator tip to the motor, and
    the aspirator tip includes an access hole in axial alignment with the hollow aspirator shaft and a selectively-removable plug for the access hole.

2. The aerator of claim 1, wherein the hollow aspirator shaft is formed from fiberglass-reinforced phenolic resin and incorporates about 13-30% fiberglass by total volume.

3. The aerator of claim 1, wherein the hollow aspirator shaft transfers only about ¼ of the vibrational energy from the aspirator tip to the motor and its bearings.

4. The aerator of claim 1, further comprising a foam restrictor assembly attached to the hollow aspirator shaft, comprising:
    an externally splined hub adhesively attached to the hollow aspirator shaft with flexible epoxy, wherein splines on the hub form recesses with a closure adjacent a first end and a circumferential slot adjacent a second end;
    a foam restrictor plate comprising a central opening with internal splines dimensioned for engaging the externally splined hub, with a first end of a plurality of the internal splines formed as extensions abutting against the closure adjacent the first end of the recesses at a first end and a second end of the extensions adjacent the circumferential slot adjacent the second end of the recesses; and
    a retainer dimensioned to engage the circumferential slot and retain the foam restrictor plate on the externally splined hub.

5. The aerator of claim 4, wherein the retainer is an e-clip.

6. The aerator of claim 1, wherein the access hole comprises internal threads and the selectively-removable plug comprises corresponding external threads, wherein the internal and external threads are oriented in a direction that tightens during motor operation.

7. The aerator of claim 6, wherein the selectively-removable plug further comprises a tool engagement surface on an exterior thereof.

8. An aerator for mixing and adding air to wastewater and for receiving rotational forces from a motor, the aerator comprising:
    a hollow aspirator shaft for connection at one end to a motor, the hollow aspirator shaft formed from fiberglass-reinforced phenolic resin comprising from about 13 percent to about 30 percent fiberglass by total volume; and
    an aspirator tip adhesively connected to another end of the hollow aspirator shaft opposite the end connected to the motor, the aspirator tip comprising:
    an access hole in axial alignment with the hollow aspirator shaft, and
    a selectively-removable plug for the access hole.

9. The aerator of claim 8, wherein the hollow aspirator shaft transfers only about ¼ of the vibrational energy from the aspirator tip to the motor and its bearings.

10. The aerator of claim 8, further comprising a foam restrictor assembly attached to the hollow aspirator shaft, comprising:
an externally splined hub adhesively attached to the hollow aspirator shaft with flexible epoxy, wherein splines on the hub form recesses with a closure adjacent a first end and a circumferential slot adjacent a second end;
a foam restrictor plate comprising a central opening with internal splines dimensioned for engaging the externally splined hub, with a first end of a plurality of the internal splines formed as extensions abutting against the closure adjacent the first end of the recesses at a first end and a second end of the extensions adjacent the circumferential slot adjacent the second end of the recesses; and
a retainer dimensioned to engage the circumferential slot and retain the foam restrictor plate on the externally splined hub.

11. The aerator of claim 10, wherein the retainer is an e-clip.

12. The aerator of claim 8, wherein the access hole comprises internal threads and the selectively-removable plug comprises corresponding external threads, wherein the internal and external threads are oriented in a direction that tightens during motor operation.

13. The aerator of claim 12, wherein the selectively-removable plug further comprises a tool engagement surface on an exterior thereof.

14. An aerator for mixing and adding air to wastewater and for receiving rotational forces from a motor, the aerator comprising:
a hollow aspirator shaft for connection at one end to the motor; and
an aspirator tip adhesively connected to another end of the hollow aspirator shaft opposite the end connected to the motor; and
a foam restrictor assembly attached to the hollow aspirator shaft using a splined hub;
wherein the aspirator shaft is comprised of material that substantially attenuates transmission of vibrational energy from the aspirator tip to the motor.

15. The aerator of claim 14, wherein the foam restrictor assembly further comprises:
an externally splined hub adhesively attached to the hollow aspirator shaft with flexible epoxy, wherein splines on the hub form recesses with a closure adjacent a first end and a circumferential slot adjacent a second end;
a foam restrictor plate comprising a central opening with internal splines dimensioned for engaging the externally splined hub, with a first end of a plurality of the internal splines formed as extensions abutting against the closure adjacent the first end of the recesses at a first end and a second end of the extensions adjacent the circumferential slot adjacent the second end of the recesses; and
a retainer dimensioned to engage the circumferential slot and retain the foam restrictor plate on the externally splined hub.

16. The aerator of claim 15, wherein the retainer is an e-clip.

17. The aerator of claim 14, wherein the hollow aspirator shaft is formed from fiberglass-reinforced phenolic resin and incorporates about 13-30% fiberglass by total volume.

18. The aerator of claim 14, wherein the hollow aspirator shaft transfers only about ¼ of the vibrational energy from the aspirator tip to the motor and its bearings.

19. The aerator of claim 14, wherein the aspirator tip includes an access hole in axial alignment with the hollow aspirator shaft and a selectively-removable plug for the access hole.

20. The aerator of claim 19, wherein the access hole comprises internal threads and the selectively-removable plug comprises corresponding external threads, wherein the internal and external threads are oriented in a direction that tightens during motor operation.

* * * * *